Patented July 4, 1950

2,514,180

UNITED STATES PATENT OFFICE 2,514,180

PROCESS OF PREPARING STANNOUS CATECHOLATES

Edward L. Carr, Akron, Ohio, assignor to The Firestone Tire & Rubber Company, Akron, Ohio, a corporation of Ohio No Drawing. Application March 20, 1946, Serial No. 655,880

10 Claims. (Cl. 260—429)

This invention relates to an improved process of producing stannous catecholates.

Difficulty was experienced in obtaining a good yield of the catecholates. It was found that if the hydroxide of an alkali metal is added to a solution of catechol or an alkyl-substituted catechol, thereby producing the alkali metal salt, and then a stannous salt which is soluble in the selected reaction medium is added to this, a high yield of the corresponding stannous catecholate is obtained. In carrying out the reaction with catechol, if the reaction medium is water, ethyl alcohol or other usual solvent, the stannous catecholate is precipitated. A nonaqueous solvent is preferred for the preparation of the stannous alkyl-substituted catecholates. Usual precipitation aids may be used, if required. The precipitate may be recovered by filtration or other suitable means.

In the treatment of alkyl-substituted catechols, the reaction is most useful with those which contain no more than eight carbon atoms in the alkyl chain. For instance, it may be used in the preparation of the stannous salts of:

4-tertiarybutyl-catechol
4-isopropyl-catechol
4-tertiaryoctyl-catechol
4-tertiaryamyl-catechol
4-phenyl-catechol
3-tertiaryamyl-catechol
3-methyl-catechol
3-tertiarybutyl-catechol
4-methyl-catechol In forming salts from the polyalkyl-substituted catecholates, it will be found that longer alkyl chains cause steric hindrance, and small yields are the most that can be obtained. The process will, therefore, generally be employed only with shorter chain polyalkylated catechols, such as:

3,5-dimethyl-catechol
3,5-di-tertiarybutyl-catechol
3,5-di-tertiaryamyl-catechol
4,5-dimethyl-catechol
3,6-dimethyl-catechol
3-methyl-4-tertiarybutyl-catechol
3-methyl-4-tertiaryamyl-catechol It may be stated as a general rule that the process is most successful in the treatment of alkyl catechols which contain no more than a total of eight carbon atoms in each side chain.

The catechol is reacted with two molecular equivalents of alkali metal hydroxide, and one molecular equivalent of stannous salt is reacted with the product. If, for any reason, hydroxide is used in any considerable excess over that required to react with the catechol, it will ordinarily be advantageous to slightly acidify the slurry containing the precipitate to prevent the formation of, or to break up, any basic tin compounds. Such acidification is not necessary and may be omitted.

The following examples are illustrative:

EXAMPLE 1

Ten grams of catechol (0.091 mole) were dissolved in an aqueous solution of 7.3 grams of sodium hydroxide (0.182 mole). Seventeen and three-tenths grams of stannous chloride (0.091 mole) were dissolved in water and added to the first solution. The resulting slurry was acidified with acetic acid and the product filtered off and dried. Yield 20.3 grams.

Analysis: Calc. for $C_6H_4O_2Sn$; Sn 52.34 per cent. Found: 51.75 (micro gravimetric).

EXAMPLE 2

Three solutions of the reactants are prepared as follows:

*Solution A*
Catechol, 5.5 parts (1 mole)
Ethanol, 50.0 parts

*Solution B*
Sodium hydroxide, 4.0 parts (2 moles)
Ethanol, 100.0 parts

*Solution C*
Stannous chloride, 9.5 parts (1 mole)
Ethanol, 50.0 parts

The catechol and sodium hydroxide solutions "A" and "B" were mixed, yielding a solution of sodium catecholate. The stannous chloride solution "C" was added to this with vigorous stirring. A white precipitate consisting of stannous catecholate was formed, removed by filtration, washed with methanol, and dried. The yield was 11.2 grams, or substantially quantitative.

The proportions and conditions in the examples may be varied within the scope of the invention as defined in the appended claims. For example, although the specification refers more particularly to carrying out the reaction in an aqueous solution of ethanol, other media may be used, such as methanol, propanol, isopropanol or any solvent that will dissolve a substantial amount of the stannous salt used in the reaction, and preferably one in which the stannous catecholate is relatively insoluble, although usual means of effecting precipitation of the product may be employed. The examples relate to the use of equivalent proportions of catechol and stannous salt and two equivalents of hydroxide, but it is understood that this is not necessary and acidification with acid is most useful where an excess of alkali has been employed.

What I claim is:

1. The process of producing stannous catecholates using a stannous salt and carrying out the reaction in a medium in which the stannous salt and an alkali metal salt of the catechol are soluble, which comprises reacting the stannous salt with an equimolecular amount of normal alkali metal catecholate in said medium, the alkali metal catecholate being of the class which consists of alkali metal catecholate and alkali metal mono- and di-alkyl-substituted catecholates containing no more than eight carbon atoms in any alkyl group.

2. The method of producing stannous catecholate which comprises reacting a normal alkali metal salt of catechol with an equimolecular amount of stannous chloride in an organic solvent in which the alkali metal salt and the stannous chloride are soluble.

3. The method of producing stannous catecholate which comprises reacting a normal alkali metal salt of catechol in aqueous solution with an equimolecular amount of water-soluble stannous salt.

4. The method of producing stannous catecholate which comprises dissolving catechol in water, reacting with two molecular weights of an alkali metal hydroxide for each molecular weight of catechol to produce the normal alkali metal salt of catechol, and then adding a molecular weight of water-soluble stannous salt for each molecular weight of catechol to produce the stannous catecholate.

5. The method of producing a stannous alkyl-substituted catecholate which comprises reacting in an organic solvent equimolecular proportions of stannous chloride and a normal alkali metal salt of an alkyl catecholate of the class consisting of mono- and di-alkyl catecholates containing no more than about eight carbon atoms in any alkyl group, using a solvent in which both the alkali metal salt and the stannous chloride are soluble.

6. The method of producing stannous catecholate which comprises dissolving catechol in water, adding an alkali metal hydroxide in excess of the amount required to produce the normal catechol salt of the alkali metal, then adding a water-soluble stannous salt to precipitate normal stannous catecholate, neutralizing the excess alkali metal hydroxide with acid, and then separating the precipitate, the alkali metal catecholate and stannous salt being reacted in equimolecular proportions.

7. The method of producing stannous catecholate which comprises dissolving catechol in two molecular equivalents of aqueous sodium hydroxide and then adding stannous chloride in an amount substantially molecularly equal to the amount of catechol employed to thereby form a precipitate of normal stannous catecholate.

8. The method of producing stannous catecholate which comprises dissolving catechol and more than two molecular equivalents of sodium hydroxide in water, then adding stannous chloride in an amount substantially molecularly equal to the amount of catechol employed to thereby precipitate normal stannous catecholate, slightly acidifying, and then recovering the stannous catecholate from the water solution the amount of sodium hydroxide used permitting formation of a precipitate of stannous catecholate.

9. The method of producing normal stannous catecholate which comprises reacting equimolecular proportions of a normal alkali metal salt of catechol and stannous chloride.

10. The method of producing a normal stannous alkyl-substituted catecholate which comprises reacting equimolecular proportions of stannous chloride and a normal alkali metal salt of an alkyl-substituted catechol which contains no more than two alkyl substituents and no more than eight carbon atoms in any one substituent.

EDWARD L. CARR.

REFERENCES CITED

The following references are of record in the file of this patent:

UNITED STATES PATENTS

| Number | Name | Date |
| --- | --- | --- |
| 1,071,568 | Pacz | Aug. 26, 1913 |
| 1,889,383 | Schmidt | Nov. 29, 1932 |
| 1,994,002 | Mills | Mar. 12, 1935 |
| 2,252,663 | Reiff | Aug. 12, 1941 |
| 2,281,401 | Wilson | Apr. 28, 1942 |
| 2,368,880 | Reiff, et al. | Feb. 6, 1945 |
| 2,384,323 | McCleary | Sept. 4, 1945 |

OTHER REFERENCES

Weinland and Water, "Zeit. Anorg. Chem." vol. 126, pages 145–146 (1922).

Weinland, et al., Zeitschrit, Anorg. Alleg. Chem. vol. 111, (1920), pages 167–174.